Feb. 2, 1926.
J. BARON
1,571,504
DOUGH CUTTING MACHINE
Filed June 3, 1922
4 Sheets-Sheet 1
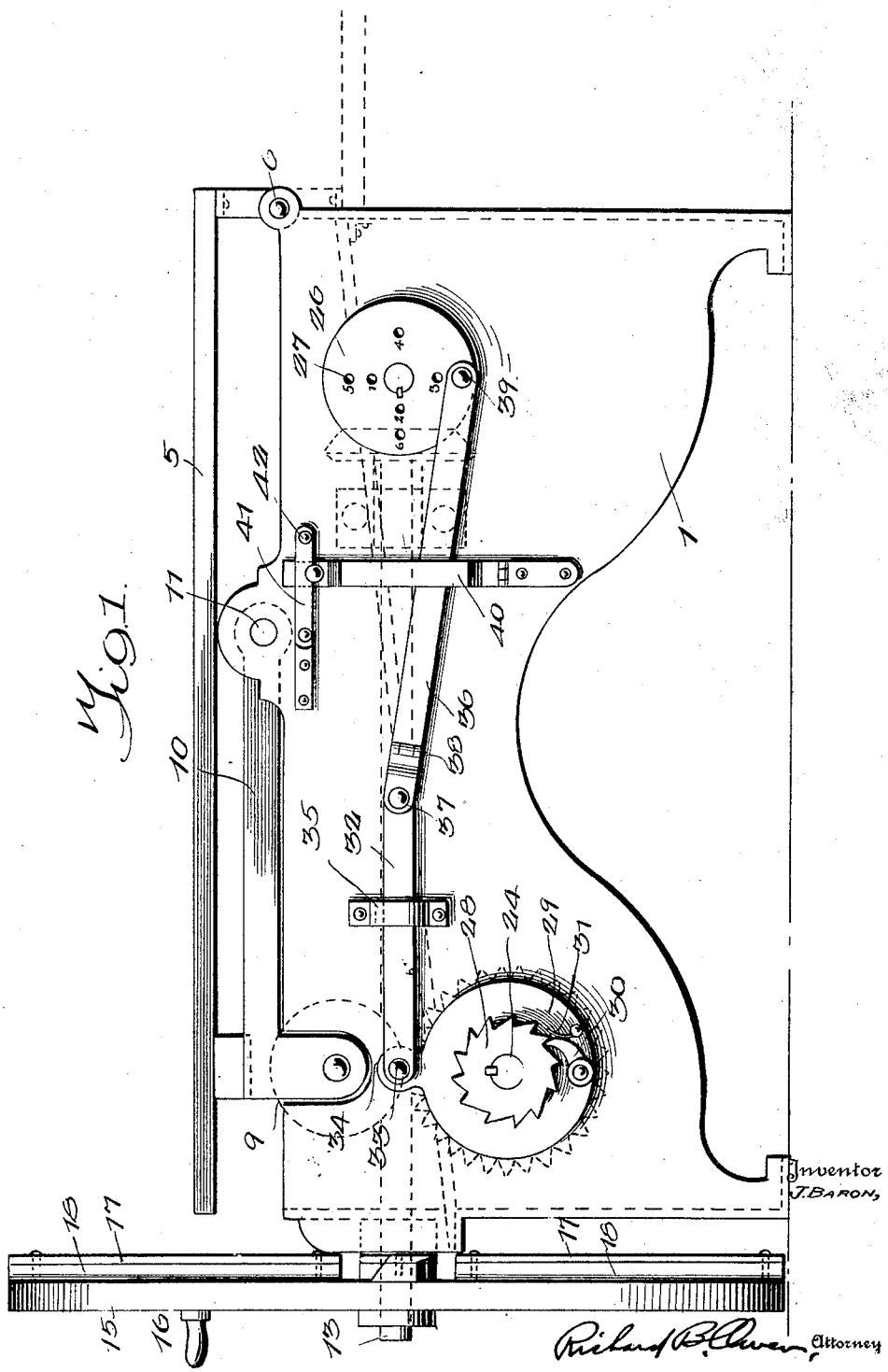

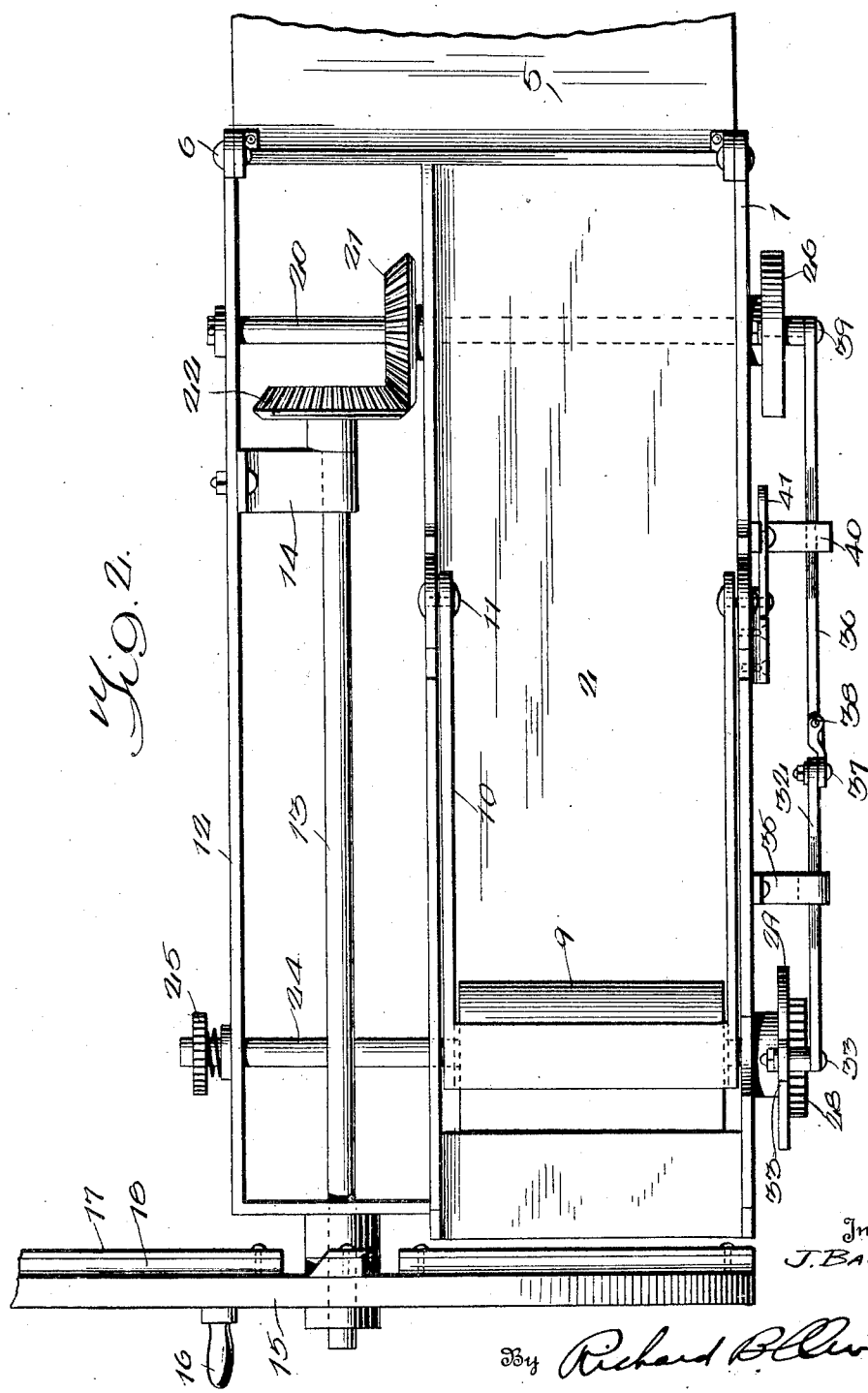

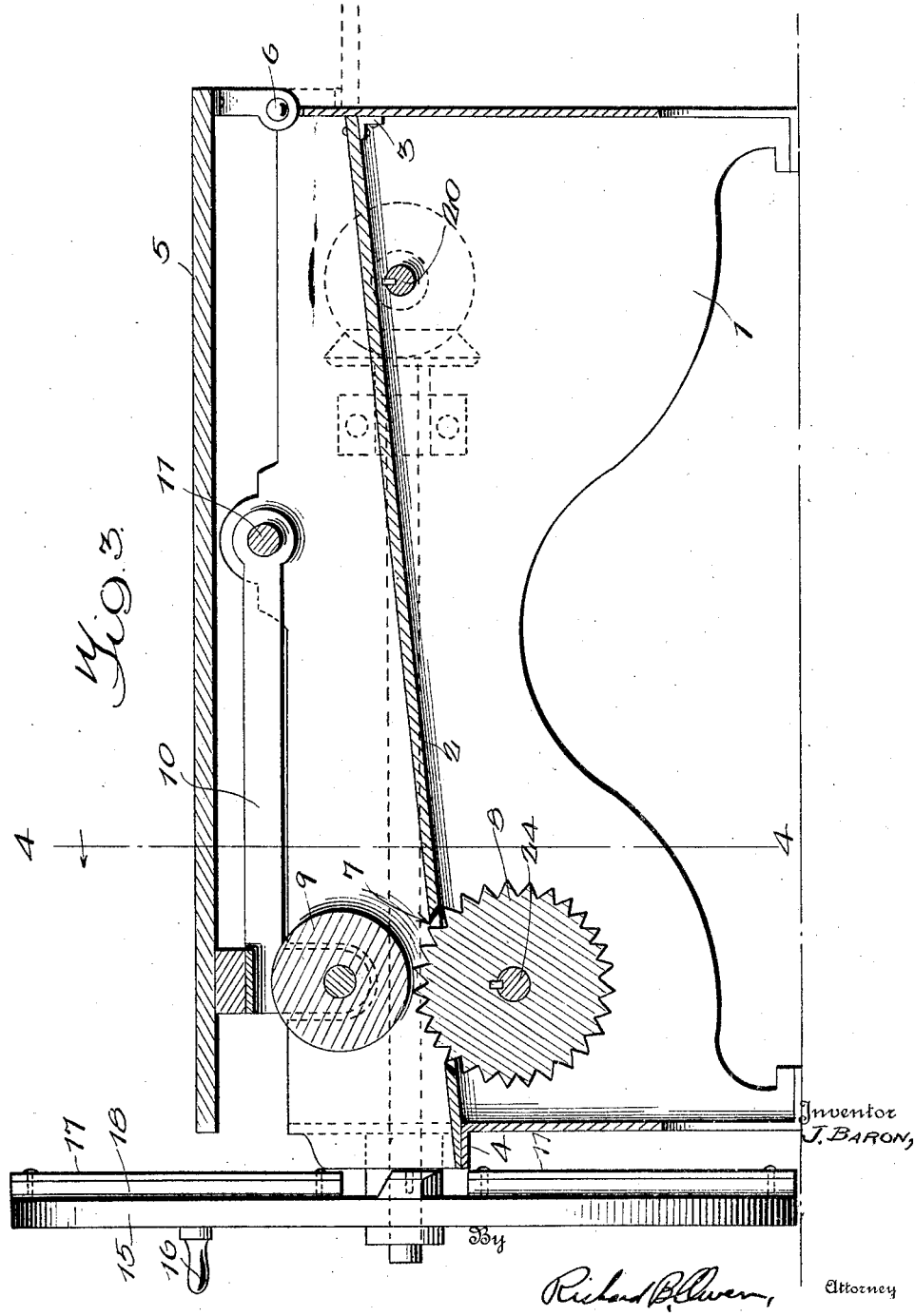

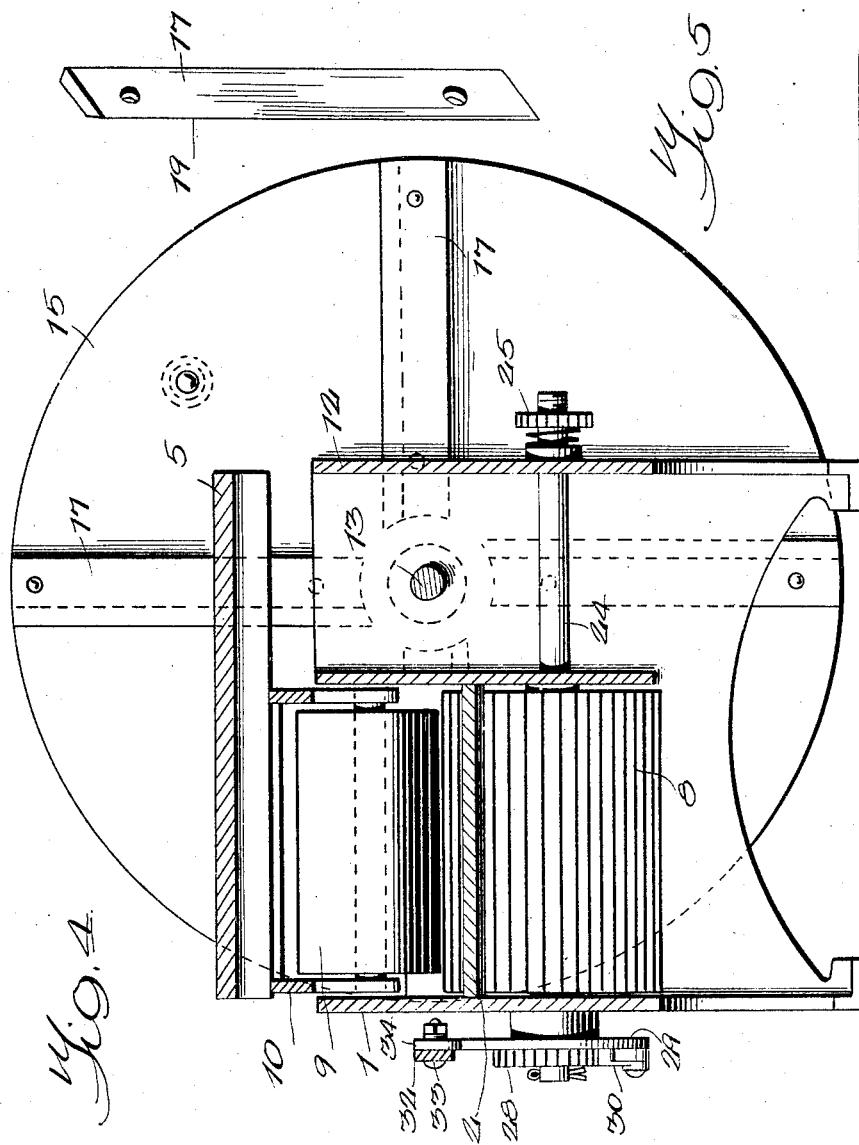

Patented Feb. 2, 1926.

1,571,504

UNITED STATES PATENT OFFICE.

JOSEPH BARON, OF NEW YORK, N. Y.; SARAH BARON AND HARRY BARON ADMINISTRATORS OF SAID JOSEPH BARON, DECEASED.

DOUGH-CUTTING MACHINE.

Application filed June 3, 1922. Serial No. 565,519.

*To all whom it may concern:*

Be it known that I, JOSEPH BARON, a citizen of the United States, residing at New York city, in the county of New York and State of New York, have invented certain new and useful Improvements in a Dough-Cutting Machine, of which the following is a specification.

The present invention relates to a dough cutting machine having for its principal object to provide means for cutting noodles of desired sizes from a strip of dough.

Another important object of the invention is to provide means for progressing the strip of dough at a desired rate of speed so that the cutting mechanism will slice off noodles of desired size depending upon the speed of the progressing mechanism.

A further object of the invention is to provide a dough cutting machine of this nature which will be extremely simple and efficient in construction, compact, durable, comparatively inexpensive to manufacture, reliable in operation, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawings:—

Figure 1 is a side elevation of the machine embodying my invention,

Figure 2 is a top plan thereof a portion of the hinged table being broken away,

Figure 3 is a longitudinal vertical section through the machine,

Figure 4 is a transverse vertical section through the machine taken substantially on the line 4—4 of Figure 3 looking in the direction of the arrow, and Figure 5 is a detailed perspective of one of the cutting blades.

Referring to the drawing in detail it will be seen that the main frame 1 of the machine supports a slanting table 2 having its rear end supported on a bracket 3 and its forward end on a shelf 4. An auxiliary table 5 is hinged to the frame 1 as at 6 and is adapted to be positioned either over the main frame or in extension thereof to the rear as is indicated in dotted lines in Figure 3 and in full lines in Figure 2.

The main table 2 is provided with an opening 7 adjacent its forward end and a grooved roller 8 is rotatably situated under this opening so as to slightly project therethrough as is indicated to advantage in Figure 3. The grooves in the roller 8 extend longitudinally thereof and have for their purpose to engage a strip of dough so as to progress the same toward the forward end of the frame. It is to be understood that the dough is previously rolled before being placed upon the table 2 and engaged with the grooved wheel 8. A pressing roller 9 carried by the hinged frame 10 which is pivoted to the frame 1 as at 11 is adapted to register with the opening 7 and to press the strip of dough in engagement with the grooved roller 8. This pressing roller 9 may be swung out of the way when the strip of dough is being placed upon the table as will be readily understood from an inspection of the drawing.

An auxiliary frame 12 is mounted to one side of the main frame 1 and supports the main drive shaft 13 which extends longitudinally thereof being journalled in the forward end of the auxiliary frame and in a bracket 14 carried intermediate the auxiliary frame adjacent the rear end thereof. The forward end of this drive shaft 13 extends through the forward end of the auxiliary frame 12 and has keyed thereto the drive wheel 15 provided with a suitable operating handle 16 upon its outer face and on its inner face with a plurality of cutting blades 17 suitably supported upon the ribs 18. These blades 17, as is shown to advantage in Figure 4, are provided with a cutting edge 19 that is adapted to engage the strip of dough as it projects over the forward end of the table 2 and shelf 4 during the rotation of the drive wheel 16. A driven shaft 20 is journalled transversely across the rear ends of the main frame 1 and auxiliary frame 12 and is provided with a beveled gear 21 keyed thereto and meshing with a beveled gear 22 keyed to the drive shaft 13. A shaft 24 is journalled in the forward ends of the frames 1 and 12 and has keyed thereto the grooved roller 8. This shaft 24 extends beyond the outer side of the auxiliary frame 12 and is provided with a knob 25 so that the grooved roller 8 may be adjusted when desired.

The shaft 24 is driven by the shaft 20 through an adjustable driving mechanism which includes the disk 26 provided with a plurality of apertures 27 positioned at varying intervals from the periphery of the disk. This disk is keyed to the shaft 20 and driven thereby. A ratchet wheel 28 is keyed to the shaft 24. A plate 29 is mounted on the shaft 24 so as to be capable of oscillation thereon and is provided with a pivoted dog 30 engaging the ratchet wheel 28 and held in engagement therewith by a spring 31 carried on the plate 29. It will therefore be seen that upon oscillation of the plate 29 there will be imparted to the shaft 24 an intermittent rotary motion. The plate 29 is oscillated by the reciprocating rod 32 pivotally connected at 33 to an ear 34 on the plate 29 and slidably mounted through a guide 35. A connecting rod 36 is pivoted at 37 to the reciprocating rod 32 and is hinged intermediate its ends as at 38. The other end of this connecting rod is provided with a pin 39 engageable with the apertures 27. When the pin 29 is in engagement with one of the apertures 27 it will be seen that an intermittent rotary motion will be imparted to the grooved roller upon rotation of the drive wheel 15 through the intermediacy of the shaft 13, gears 22 and 21, shaft 20, disk 26, connecting rod 36, reciprocating rod 32, plate 29, ratchet wheel 28, dog 30 and shaft 24. The connecting rod 36 reciprocates in a hinged guide 40 which is held in place by the rod 41 pivoted at 42. When this rod 41 is in a horizontal position such as is shown in Figure 1, extending over the upper end of the guide 40 it will hold the guide in a locked position. Should it be desired to change the amount of rotation of the grooved roller the guide 40 may be hinged to an open position and the connecting rod pulled out of the aperture 27 in which it is positioned, the hinge 38 being provided for this purpose, and the pin 39 placed in one of the other apertures. It will be readily understood that the closer the pin 39 is to the periphery of the disk 28 the greater will be the movement of the grooved roller.

It is thought that the construction and operation of the machine will now be understood without a more detailed description thereof. It is desired, however, to point out that I have merely described the present embodiment of my invention by way of example and that numerous changes in form, in the details of construction, and in the combination and arrangement of parts may be resorted to without departing from the spirit of the invention as hereinafter claimed.

Having thus described my invention what I claim as new is:—

1. In combination, a table, a roller associated with the table for progressing a strip of dough thereacross, a ratchet wheel associated with the roller, a plate associated with the ratchet wheel, spring pressed dog on the plate engageable with the ratchet wheel, means for oscillating the plate so as to impart an intermittent motion to the roller, means for cutting the strip of dough into the form of noodles, a connecting rod attached at one end to the plate, a disk rotatably mounted and provided with a plurality of apertures situated at various distances from its periphery, a pin on the connecting rod engageable with the apertures, and means for imparting a rotary motion to said disk all in the manner and for the purpose specified, said connecting rod being formed in two hinged parts so that its ends may be readily engaged and disengaged with the apertures in said disk.

2. In combination, a table, a roller associated with the table for progressing a strip of dough thereacross, means for cutting the strip of dough into the form of noodles, an intermittently operated mechanism for said roller, a connecting rod for operating the mechanism, a rotatably mounted disk provided with a plurality of apertures situated at various distances from its periphery, a pin on the connecting rod engageable with the openings, said connecting rod being formed in hinged sections so that the pin may be moved in and out of engagement with the apertures of the disk, and a guide for said connecting rod for holding the pin in engagement with one of the apertures in said disk, said guide being hingedly mounted and including means for holding the same in an operative position.

In testimony whereof I affix my signature.

JOSEPH BARON.